(12) United States Patent
Wu et al.

(10) Patent No.: US 11,632,708 B2
(45) Date of Patent: Apr. 18, 2023

(54) COMMON SEARCH SPACE CONFIGURATION AND SYSTEM INFORMATION ACQUISITION

(71) Applicant: Google LLC, Mountain View, CA (US)

(72) Inventors: Chih-Hsiang Wu, Taoyuan (TW); Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/836,772

(22) Filed: Jun. 9, 2022

(65) Prior Publication Data

US 2022/0303875 A1    Sep. 22, 2022

Related U.S. Application Data

(63) Continuation of application No. 17/279,045, filed as application No. PCT/US2019/052409 on Sep. 23, 2019.

(60) Provisional application No. 62/735,572, filed on Sep. 24, 2018.

(51) Int. Cl.
*H04W 48/08* (2009.01)

(52) U.S. Cl.
CPC .................................. *H04W 48/08* (2013.01)

(58) Field of Classification Search
None
See application file for complete search history.

(56) References Cited

U.S. PATENT DOCUMENTS

| | | | |
|---|---|---|---|
| 9,445,409 B2 | 9/2016 | Liao et al. | |
| 10,595,303 B2 * | 3/2020 | Sartori | H04W 24/02 |
| 11,026,215 B2 * | 6/2021 | Niu | H04W 72/1289 |
| 2014/0293939 A1 | 10/2014 | Nory et al. | |
| 2017/0195999 A1 | 7/2017 | Feng et al. | |
| 2018/0115943 A1 | 4/2018 | Park et al. | |

(Continued)

FOREIGN PATENT DOCUMENTS

| | | |
|---|---|---|
| EP | 3364691 | 8/2018 |
| TW | 201531139 | 8/2015 |
| TW | 201824923 | 7/2018 |

(Continued)

OTHER PUBLICATIONS

"Common Search Space", 3GPP TSG RAN WG1 #88—R1-1702976, Feb. 2017, 3 pages.

(Continued)

*Primary Examiner* — Hong S Cho
(74) *Attorney, Agent, or Firm* — Colby Nipper PLLC (57) ABSTRACT

This document describes methods and systems for common search space configuration and system information acquisition. As part of the methods and systems, a base station wirelessly communicating with a user equipment that is in an engaged mode determines to configure a common search space through which the user equipment can receive a system information block that is other than a system information block type 1 or a master information block. The base station transmits a first message that includes a set of common search space configuration parameters for the user equipment to receive the other system information block. The base station transmits, in accordance with the set of common search space configuration parameters, a second message that includes the other system information block.

24 Claims, 7 Drawing Sheets

(56) References Cited

U.S. PATENT DOCUMENTS

2019/0387580 A1* 12/2019 Chang .................. H04L 5/10
2022/0110048 A1 4/2022 Wu et al.

FOREIGN PATENT DOCUMENTS

WO 2015046853 4/2015
WO 2020068656 4/2020

OTHER PUBLICATIONS

"Correction on SIB1 Acquisition", 3GPP TSG-RAN2 Meeting #106 Reno, US, May 2019, 7 pages.
"Foreign Office Action", IN Application No. 202147003811, dated Jan. 10, 2022, 6 pages.
"Foreign Office Action", TW Application No. 108134454, dated Jun. 1, 2021, 6 pages.
"Foreign Office Action", TW Application No. 108134454, dated Jul. 17, 2020, 12 pages.
"Foreign Office Action", TW Application No. 108134454, dated Nov. 26, 2021, 19 pages.
"International Preliminary Report on Patentability", Application No. PCT/US2019/052409, dated Aug. 6, 2020, 20 pages.
"International Search Report and Written Opinion", Application No. PCT/US2019/052409, dated Nov. 19, 2019, 20 pages.
"Notification and Retrieval of Updated SI for a UE in an Active DL BWP", 3GPP TSG-RAN WG2 NR AH#3—Tdoc R2-1800294, Jan. 2018, 6 pages.
"Paging and Broadcast Information Handling in NR SA for RRC Connected State UE", 3GPP TSG-RAN WG2 Meeting #101, Athens, Greece, Feb. 2018, 5 pages.
"SI Reception in RRC Connected: Bandwidth Part Aspects", 3GPP TSG-RAN WG2 #99bis, Prague, Czech Republic, Oct. 2017, 3 pages.
"Extended European Search Report", EP Application No. 22187418. 3, dated Nov. 2, 2022, 13 pages.
"Foreign Office Action", TW Application No. 111121603, dated Aug. 29, 2022, 6 pages.

* cited by examiner

COMMON SEARCH SPACE CONFIGURATION AND SYSTEM INFORMATION ACQUISITION

RELATED APPLICATIONS

This application is a continuation of and claims priority to U.S. Non-Provisional patent application Ser. No. 17/279,045, filed on Mar. 23, 2021, which in turn is a National Stage Entry of International Patent Application Serial No. PCT/US2019/052409, filed on Sep. 23, 2019, which in turn claims priority to U.S. Provisional Patent Application Ser. No. 62/735,572, filed on Sep. 24, 2018, the disclosures of which are incorporated by reference herein in their entireties.

BACKGROUND

A base station, such as a Fifth Generation new radio (5GNR) base station, may establish a wireless communication connection, or wireless link, with a user equipment (UE). In order for the base station and the UE to communicate successfully, the base station and the UE must synchronize on system information associated with the wireless link. Examples of such types of system information can include system information parameters that define a system bandwidth, a system frame number, cell access related information, cell selection information, or scheduling information. Typically, the base station and the UE may exchange such system information by communicating system information blocks (SIBs) across a common search space of a unified air interface.

Wireless communication standards may define common search space configurations of the unified air interface. As part of configuring a common search space, the base station may schedule resources of a bandwidth part (BWP) of the unified air interface to follow a wireless communication standard. Knowing the common search space configuration, as a result of the wireless communication standard, the UE can acquire SIBs that enable the UE to communicate successfully with the base station.

Today, wireless communication standards define common search space configuration techniques for a UE to acquire a system information block type 1 (SIB1) or a master information block (MIB). However, common search space configuration techniques for acquiring a SIB that is other than the SIB1 and the MIB (e.g., another system information block, or OSIB) are currently undefined.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described. The method is performed by a base station wirelessly communicating with a UE that is in an engaged mode. The method includes determining to configure a common search space through which the UE can receive an OSIB. As part of the method, the base station transmits a first message that includes a set of common search space configuration parameters for the UE to receive the OSIB. The method also includes the base station transmitting, in accordance with the common search space parameters, a second message that includes the OSIB and the base station transmitting additional messages in accordance with system information parameters contained in the OSIB.

In other aspects, a method is described. The method is performed by a UE that is an engaged mode. The method includes the UE receiving a first message that includes a set of common search space configuration parameters for the UE to receive an OSIB. As part of the method, the UE configures a transceiver of the UE to monitor a common search space for the OSIB in accordance with the set of common search space configuration parameters. The method also includes the UE receiving a second message that includes the OSIB and the UE transmitting additional messages in accordance with system information parameters acquired from OSIB.

In yet other aspects, a base station is described. The base station includes a wireless transceiver, a processor; and a computer-readable storage medium having a search space configuration manager application. When executed by the processor, the search space configuration manager application directs the base station to perform operations that include (i) determining to configure a common search space for a UE to receive an OSIB (ii) transmitting, over an active bandwidth part (BWP), a first message that includes a set of common search space configuration parameters for the UE to receive the OSIB, (iii) transmitting a second message that includes the OSIB, and (iv) wirelessly communicating with the UE in accordance with system information parameters contained in the OSIB.

The details of one or more implementations of common search space configuration and system information acquisition are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of common search space configuration and system information acquisition. The use of the same reference numbers in other instances in the description and the figures may indicate like elements.

DETAILED DESCRIPTION

This document describes methods and systems for common search space configuration and system information acquisition. As part of the methods and systems, a base station wirelessly communicating with a UE that is in an engaged state determines to configure a common search space through which the UE can receive an OSIB. The base station transmits a first message that includes a set of common search space configuration parameters for the UE to receive the OSIB. The base station then transmits, in accordance with the set of common search space configuration parameters, a second message that includes the OSIB.

The base station includes an executable search space manager application and the UE includes an executable system information block (SIB) manager application. When executed, the respective applications direct the base station and the UE to perform complementary operations as described herein.

Operating Environment

Figure 1:
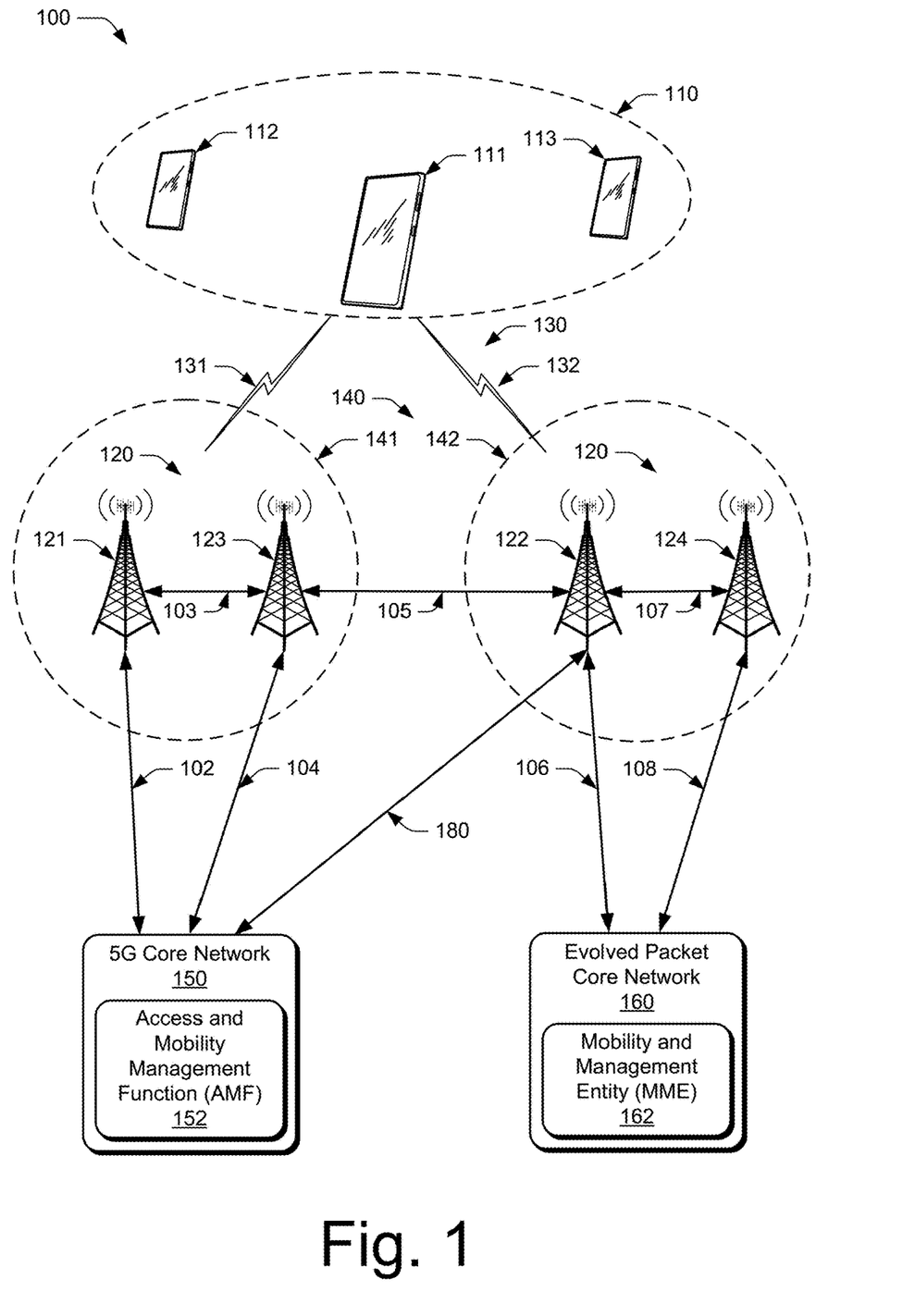
FIG. 1 illustrates an example wireless network environment in which various aspects of common search space configuration and system information acquisition can be implemented.

FIG. 1 illustrates an example environment 100, which includes multiple UE 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Furthermore, within the environment 100, the UE 110 and the base station 120 may be in an engaged state with each other. While in the engaged state, the base station 120 may determine to configure a common search space through which the UE 110 can receive an OSIB (e.g., a system information block that is other than a SIB1 or a MIB).

A portion of a wireless communication protocol (e.g., a protocol as specified in 3GPP TS 38.331 section 5.2.2.2) may specify techniques associated with the UE 110 acquiring the OSIB. The wireless communication protocol may specify an expected behavior of the UE 110, such as monitoring (e.g., monitoring a common search space for a message containing the OSIB) or sequencing of system information block acquisition (e.g., acquiring the OSIB prior to acquiring a SIB1 or a MIB).

In general, different types of OSIBs may indicate different changes to system information (SI) needed for different types of wireless communication between the base station 120 and the UE 110. As an example of different types of OSIBs indicating different changes to system information, system information relative to changing paging from a base station may be contained in an OSIB that is a system information block type 6 (e.g., a SIB6), a system information block type 7 (e.g., a SIB7), or system information block type 8 (e.g., a SIB8). Examples of paging include the base station 120 transmitting information as part of a public warning system (PWS), an earthquake and tsunami warning system (ETWS), and a commercial mobile alert system (CMAS).

Example Mechanisms

Figure 2:
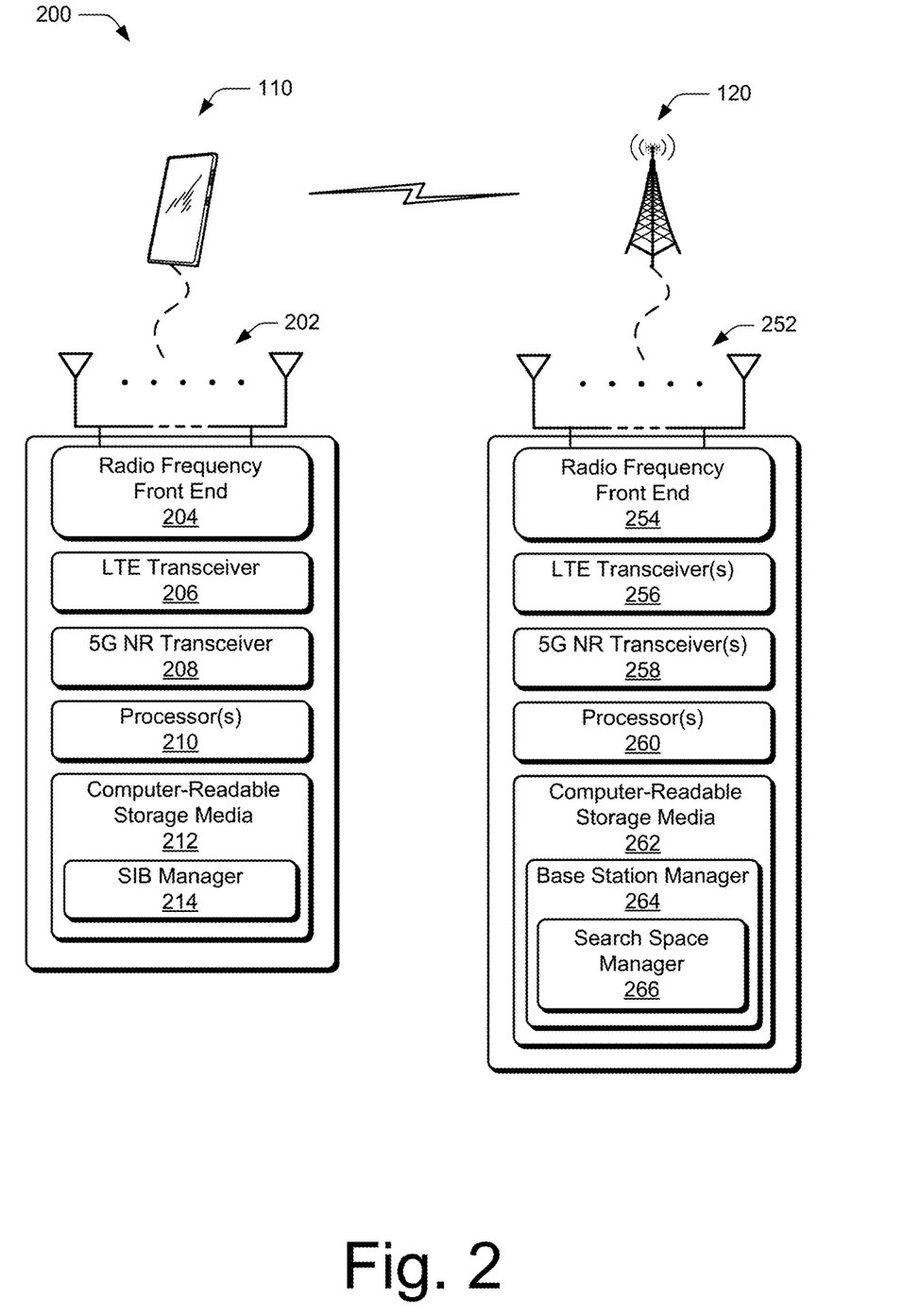
FIG. 2 illustrates an example device diagram for devices that can implement various aspects of common search space configuration and system information acquisition.

FIG. 2 illustrates an example device diagram 200 of a UE (e.g., the UE 110 of FIG. 1) and a base station (e.g., the base stations 120 of FIG. 1). The UE 110 and the base station 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory.

CRM 212 also includes an executable application (e.g., SIB manager 214) for directing the UE 110 to perform operations relative to receiving an OSIB. In at least some aspects, the SIB manager 214, when executed by the processor 210, may direct the UE 110 to perform operations that include receiving a set of configuration parameters for a common search space, configuring the UE to monitor the common search space for the OSIB in accordance with the set of configuration parameters, receiving the OSIB, and wirelessly communicating with the base station in accordance with system information parameters contained in the OSIB. Furthermore, and in some instances, the SIB manager 214 may direct the UE 110 to perform operations relative to receiving a SIB1 or a MIB.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also includes processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory.

The CRM 262 also includes a base station manager 264. Alternately or additionally, the base station manager 264 may be implemented in whole or part as hardware logic or circuitry integrated with or separate from other components of the base station 120.

The base station manager 264 includes an executable application (e.g., search space manager 266) for configuring a common search space and transmitting an OSIB. In at least some aspects the search space manager 266, when executed by the processor 260, directs the base station 120 to perform operations that include determining to configure a common search space through which the UE 110 can receive a system information block (e.g., an OSIB), transmitting a message to the UE 110 that includes a set of configuration parameters for the common search space, transmitting the OSIB to the UE in accordance with the set of configuration parameters for the common search space, and wirelessly communicating with the UE in accordance with system information parameters contained in the OSIB.

Figure 3:
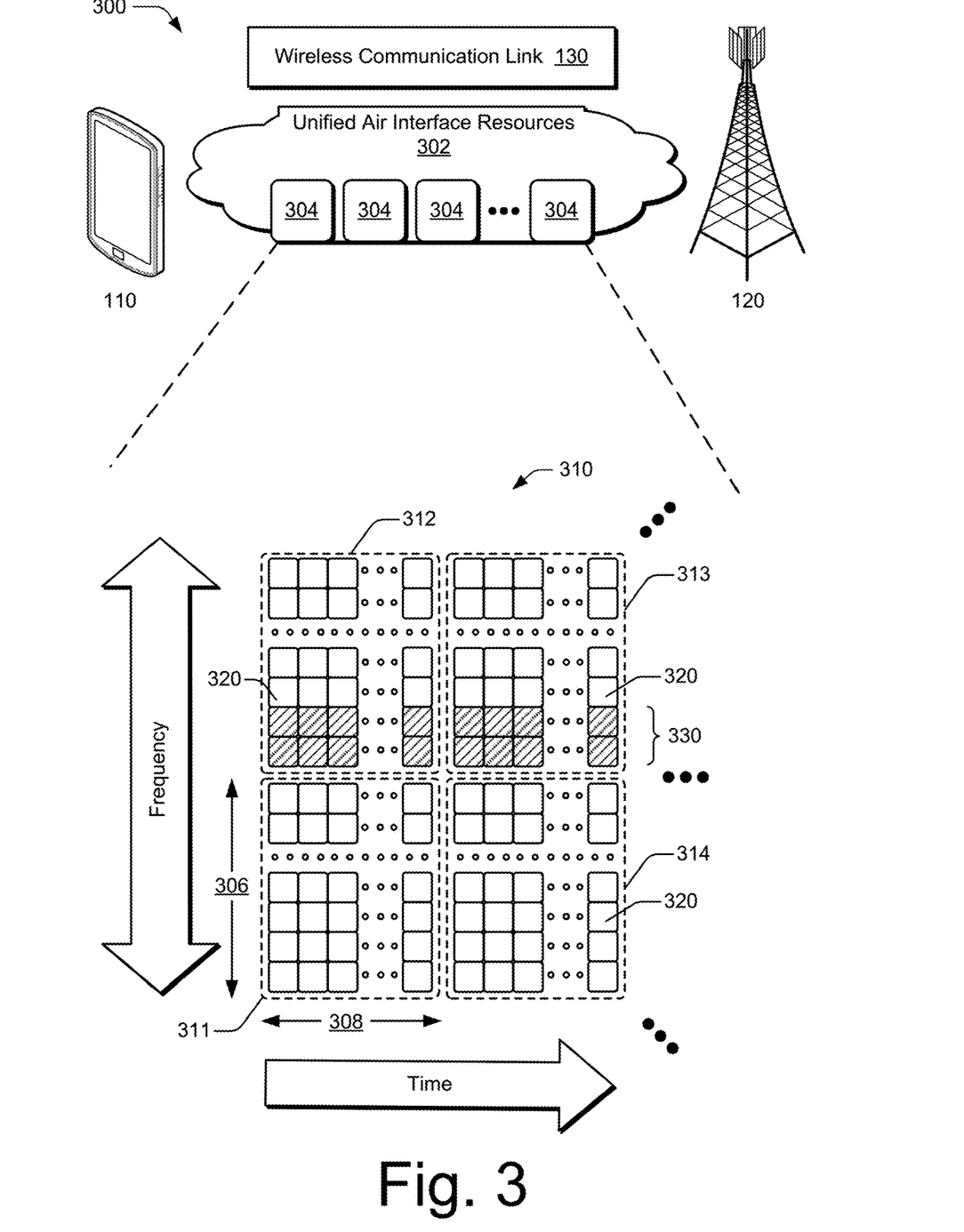
FIG. 3 illustrates an example unified air interface in accordance with aspects of techniques described herein.

FIG. 3 illustrates an example unified air interface 300 in accordance with aspects of techniques described herein. FIG. 3 illustrates an example interface 300 that extends between a UE (e.g., the UE 110) and a base station (e.g., the base station 120). The example interface 300 includes unified air interface resources 302 that can be divided into resource units 304, each of which occupies some intersection of a frequency spectrum and elapsed time. A portion of the unified air interface resources 302 is illustrated graphically in a grid or matrix having multiple resource blocks 310, including example resource blocks 311, 312, 313, 314. An example of a resource unit 304, therefore, includes at least one resource block 310. As shown, time is depicted along the horizontal dimension as the abscissa axis, and frequency is depicted along the vertical dimension as the ordinate axis. The unified air interface resources 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 schedules and allocates portions (e.g., resource units 304) of the unified air interface resources 302 for uplink and downlink communications. Each resource block 311 of network access resources may be allocated to support a wireless link 130 of the UE 110. In the lower-left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

As part of wireless communications between the UE 110 and the base station 120, configuring a common search space may include the base station scheduling resources of the unified air interface resources 302 (e.g., the processor 260 executing code of the base station manager 264 including the search space manager 266). The base station 120 schedules resources of the unified air interface resources 302 in an active bandwidth part (e.g., BWP 330) being used as the UE 110 and the base station 120 wirelessly communicate while the UE is in an engaged state.

These resources (e.g., the BWP 330) may be used for wirelessly communicating messages that enable search space configuration and OSIB acquisition. Messages transmitted using the BWP 330 may also include the OSIB. Transmission and reception of the message that includes the OSIB may in some instances use dedicated signaling (e.g., radio resource control signaling) and a message (e.g., an RRCReconfiguration message) associated with a wireless communication protocol.

Figure 4:
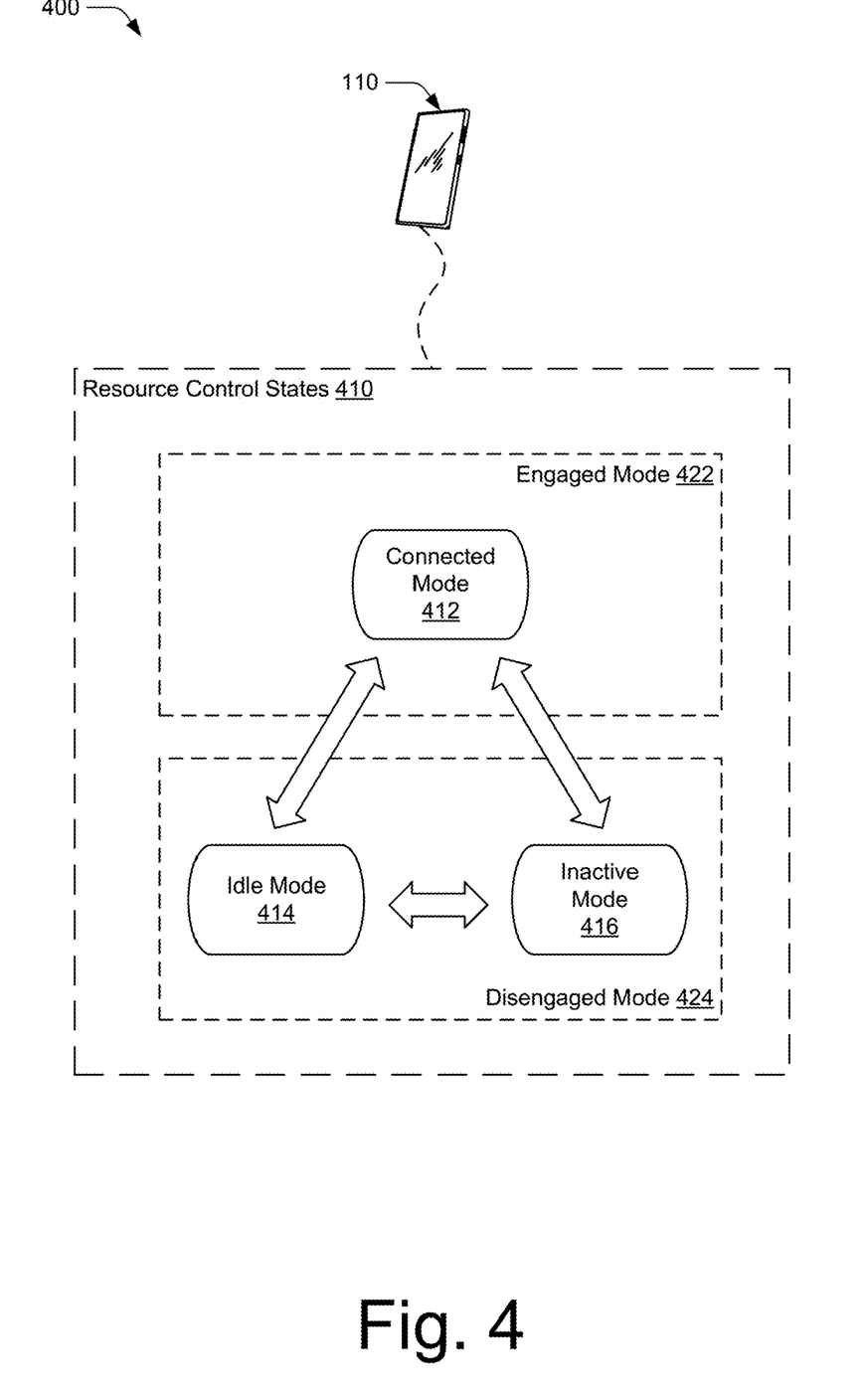
FIG. 4 illustrates example user equipment states in accordance with aspects of techniques described herein.

FIG. 4 illustrates example user equipment states 400 between a UE (e.g., the UE 110) and a base station (e.g., the base station 120). Generally, a wireless network operator provides telecommunication services to user equipment through a wireless network. To communicate wirelessly with the network, a UE 110 utilizes a radio resource control (RRC) procedure to establish a connection to the network via a cell (e.g., the base station, a serving cell). Upon establishing the connection to the network through the base stations 120, the UE 110 enters a connected mode (e.g., RRC-connected mode, RRC_CONNECTED state, NR-RRC CONNECTED state, or E-UTRA RRC CONNECTED state).

The UE 110 operates according to different resource control states 410. Different situations may occur that cause the UE 110 to transition between different resource control states 410 as determined by the radio access technology. Example resource control states 410 illustrated in FIG. 4 include a connected mode 412, an idle mode 414, and an inactive mode 416. A UE 110 is either in the connected mode 412 or in the inactive mode 416 when an RRC connection is active. If an RRC connection is not active, then the UE 110 is in the idle mode 414.

In establishing the RRC connection, the UE 110 may transition from the idle mode 414 to the connected mode 412. After establishing the connection, the UE 110 may transition (e.g., upon connection inactivation) from the connected mode 412 to an inactive mode 416 (e.g., RRC-inactive mode, RRC_INACTIVE state, NR-RRC INACTIVE state) and the UE 110 may transition (e.g., via an RRC connection resume procedure) from the inactive mode 416 to the connected mode 412. After establishing the connection, the UE 110 may transition between the connected mode 412 to an idle mode 414 (e.g., RRC-idle mode, RRC_IDLE state, NR-RRC IDLE state, E-UTRA RRC IDLE state), for instance upon the network releasing the RRC connection. Further, the UE 110 may transition between the inactive mode 416 and the idle mode 414.

The UE 110 may be in an engaged mode 422 or may be in a disengaged mode 424. As used herein, an engaged mode 422 is a connected mode (e.g., connected mode 412) and a disengaged mode 424 is an idle, disconnected, connected-but-inactive, or connected-but-dormant mode (e.g., idle mode 414, inactive mode 416). In some cases, in the disengaged mode 424, the UE 110 may still be registered at a Non-Access Stratum (NAS) layer with an active radio bearer (e.g., in inactive mode 416).

Each of the different resource control states 410 may have different quantities or types of resources available, which may affect power consumption within the UE 110. In general, the connected mode 412 represents the UE 110 actively connected to (engaged with) the base stations 120. In the inactive mode 416, the UE 110 suspends connectivity with the base station 120 and retains information that enables connectivity with the base station 120 to be quickly re-established. In the idle mode 414, the UE 110 releases the connection with the base stations 120.

Some of the resource control states 410 may be limited to certain radio access technologies. For example, the inactive mode 416 may be supported in LTE Release 15 (eLTE) and 5G NR, but not in 3G or previous generations of 4G standards. Other resource control states may be common or compatible across multiple radio access technologies, such as the connected mode 412 or the idle mode 414.

In the context of the present application, if the UE 110 is in an engaged mode corresponding to the connected mode 412 (e.g., the RRC_Connected state), a BWP of an air interface may actively support wireless communications between the UE 110 and the base station 120 (e.g., radio resource control wireless communications). Such a BWP may be the BWP 330 of FIG. 3.

Example Methods

Figure 5:
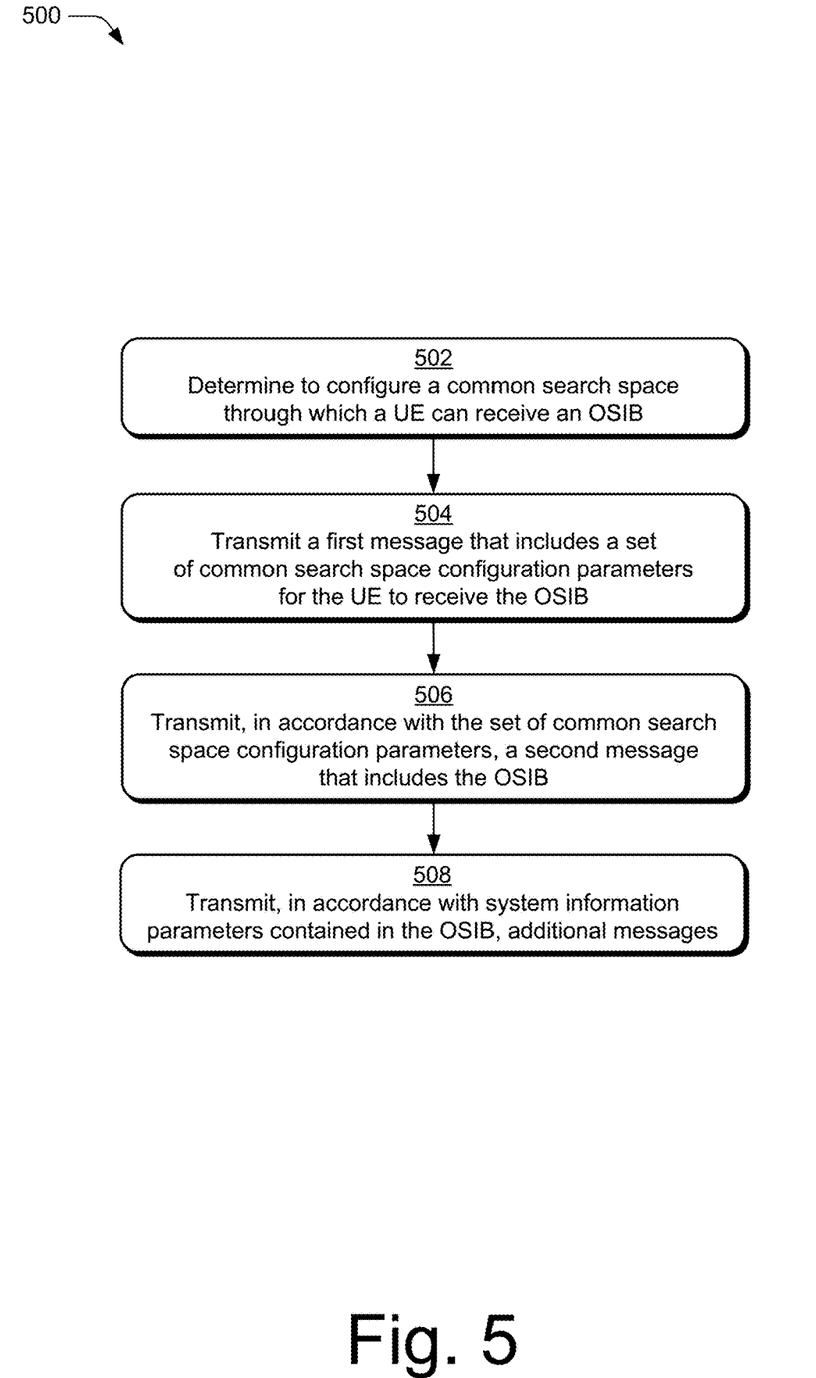
FIG. 5 illustrates an example method performed by a base station in accordance with aspects of techniques described herein.

FIG. 5 illustrates an example method 500 performed by a base station in accordance with aspects of techniques described herein. The method, illustrated by a series of operational blocks 502-508, may be performed by one or more elements of the base station 120 of FIG. 1 as directed by the processor 260 executing the search space manager 266. The method may also include elements of FIGS. 2-4. Sequencing of the operational blocks 502-508, including underlying or detailed elements of the operational blocks 502-508, is not limited by the illustration of FIG. 5 or by the description of FIG. 5 hereafter. The operational blocks 502-508, or portions of the operational blocks 502-508, may also be performed by entities other than the base station 120 (e.g., the 5GCN 150). The method may occur while the UE 110 of FIG. 1 is in an engaged state with the base station 120.

At block 502 the base station 120 determines to configure a common search space for the UE 110 to receive an OSIB (e.g., a SIB other than a SIB1 or a MIB). The UE 110 may be in an engaged mode that corresponds to engaged mode 422 (e.g., an RCC_CONNECTED state).

At block 504 the base station 120 transmits, to the UE 110, a first message that includes a set of common search space configuration parameters for the UE 110 to receive the OSIB. The set of common search space configuration parameters may identify resources of an active BWP (e.g., the BWP 330 of the unified air interface 300) through which the UE 110 may receive the OSIB. In some instances, the base station 120 (e.g., the search space manager 266) may determine the set of common search space configuration parameters, while in other instances the base station 120 may receive the set of common search space configuration parameters from a core network (e.g., the 5GCN 150). The base station 120 may also receive, from the core network, another set of common search space configuration parameters for a SIB1.

In some instances, transmitting the first message that includes the set of common search space configuration parameters may use dedicated signaling (e.g., radio resource control signaling) to transmit a dedicated message (e.g., an RRCReconfiguration message). Furthermore, and in some instances, the first message may include an additional set of common search space configuration parameters for a SIB1 or a MIB.

At block 506, the base station 120 transmits, to the UE 110 and through the common search space in accordance with the first set of common search space configuration parameters, a second message that includes the OSIB. In some instances, the OSIB may contain system information parameters that correspond to a paging operation of the base station 120 (e.g., PWS, ETWS, or CMAS). In such an instance, the OSIB may be a SIB6, SIB7, or SIB8.

At block 508, the base station 120 transmits, to the UE 110, additional messages in accordance with system information parameters contained in the OSIB. In an instance where the OSIB contains parameters that correspond to a paging operation, transmitting the additional messages may include transmitting a PWS message, an ETWS message, or a CMAS message.

Although method 500 describes examples of the OSIB containing system information parameters that enable the base station 120 to transmit messages to the UE 110 (e.g., block 508), other permutations are possible. For instance, different OSIBs may contain different system information parameters that enable the UE to transmit messages to the base station 120 (and the base station 120 may receive additional messages in accordance with the different system information parameters).

Figure 6:
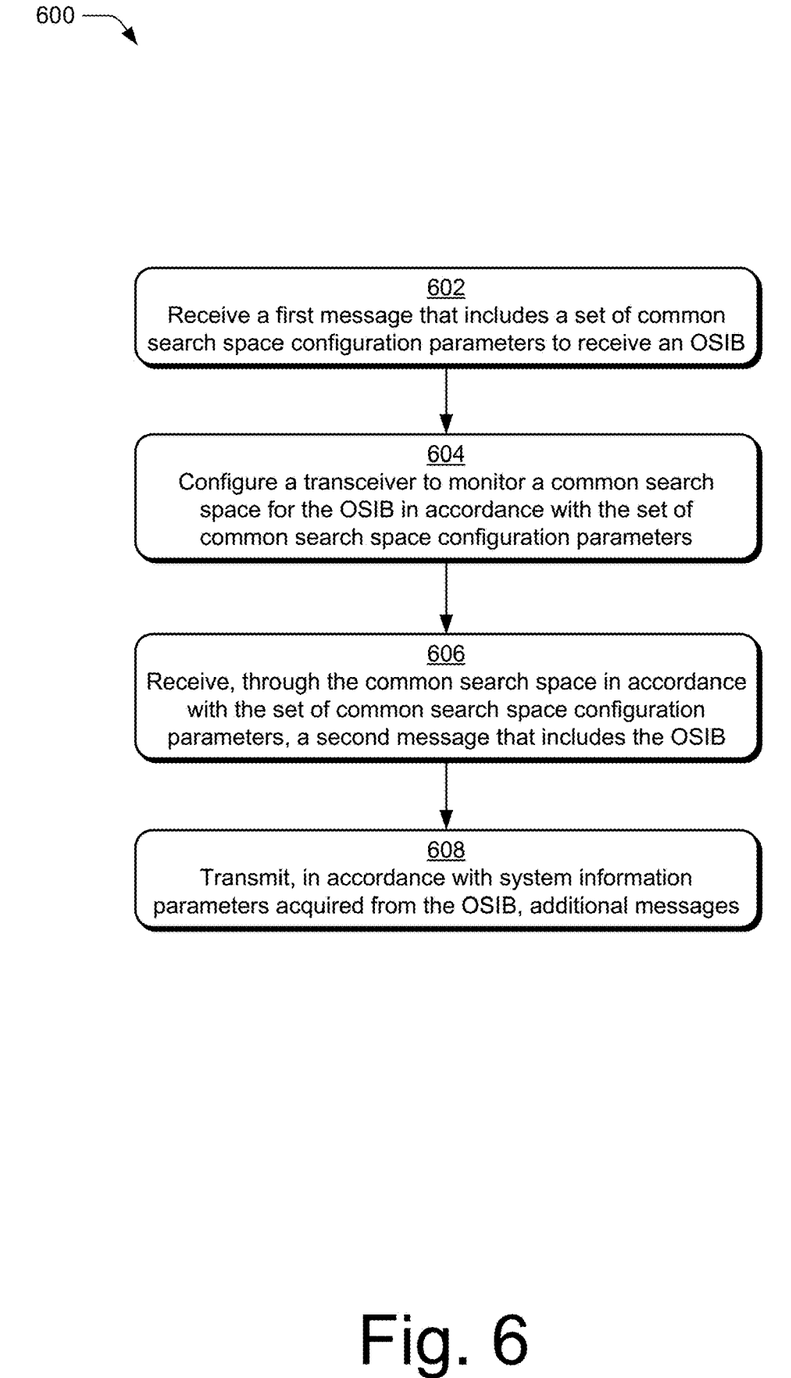
FIG. 6 illustrates an example method performed by a UE in accordance with aspects of techniques described herein.

FIG. 6 illustrates an example method 600 performed by a user equipment accordance with aspects of techniques described herein. The method, illustrated by a series of operational blocks 602-608, may be performed by one or more elements of the UE 110 of FIG. 1 as directed by the processor 210 executing the SIB manager 214. The method may also include elements of FIGS. 2-4. Sequencing of the operational blocks 602-608, including underlying or detailed elements of the operational blocks 602-608, is not limited by the illustration of FIG. 6 or by the description of FIG. 6 hereafter. The operational blocks 602-608, or operations of the operational blocks 602-608, may also be performed by entities other than the UE 110. The method may be performed by the UE 110 while it is in an engaged mode that corresponds to the engaged mode 422 (e.g., an RRC_CONNECTED state).

At block 602 the UE 110 receives a first message that includes a set of common search space configuration parameters for the UE 110 to receive an OSIB (e.g., a SIB that is other than a SIB1 or a MIB). The UE 110 may be in an engaged mode that corresponds to engaged mode 422 (e.g., an RCC_CONNECTED state).

In some instances, the first message may be a dedicated message that is received through dedicated signaling (e.g., an RRCReconfiguration message). Furthermore, and in some instances, the first message may include an additional set of common search space configuration parameters for the UE to receive a SIB1 or a MIB.

At block 604 the UE 110 configures its transceiver to monitor a common search space for the OSIB in accordance with the set of common search space configuration parameters.

At block 606 the UE 110 receives, from the base station, a second message that includes the OSIB. The second message is received through the common search space in accordance with the set of common search space configuration parameters. As examples, the OSIB may be a system information block type 2 (SIB2), a system information block type 3 (SIB3), a system information block type 4 (SIB4), or a system information block type 5 (SIB5).

At block 608 the UE transmits additional messages in accordance with system information parameters acquired from the OSIB.

Although method 600 describes examples of the OSIB containing system information parameters that enable the UE 110 to transmit additional messages to the base station 120 (e.g., block 608), other permutations are possible. For instance, different OSIBs may contain different system information parameters that the UE 110 may use to receive messages from the base station 120.

Signaling and Control Transactions

Figure 7:
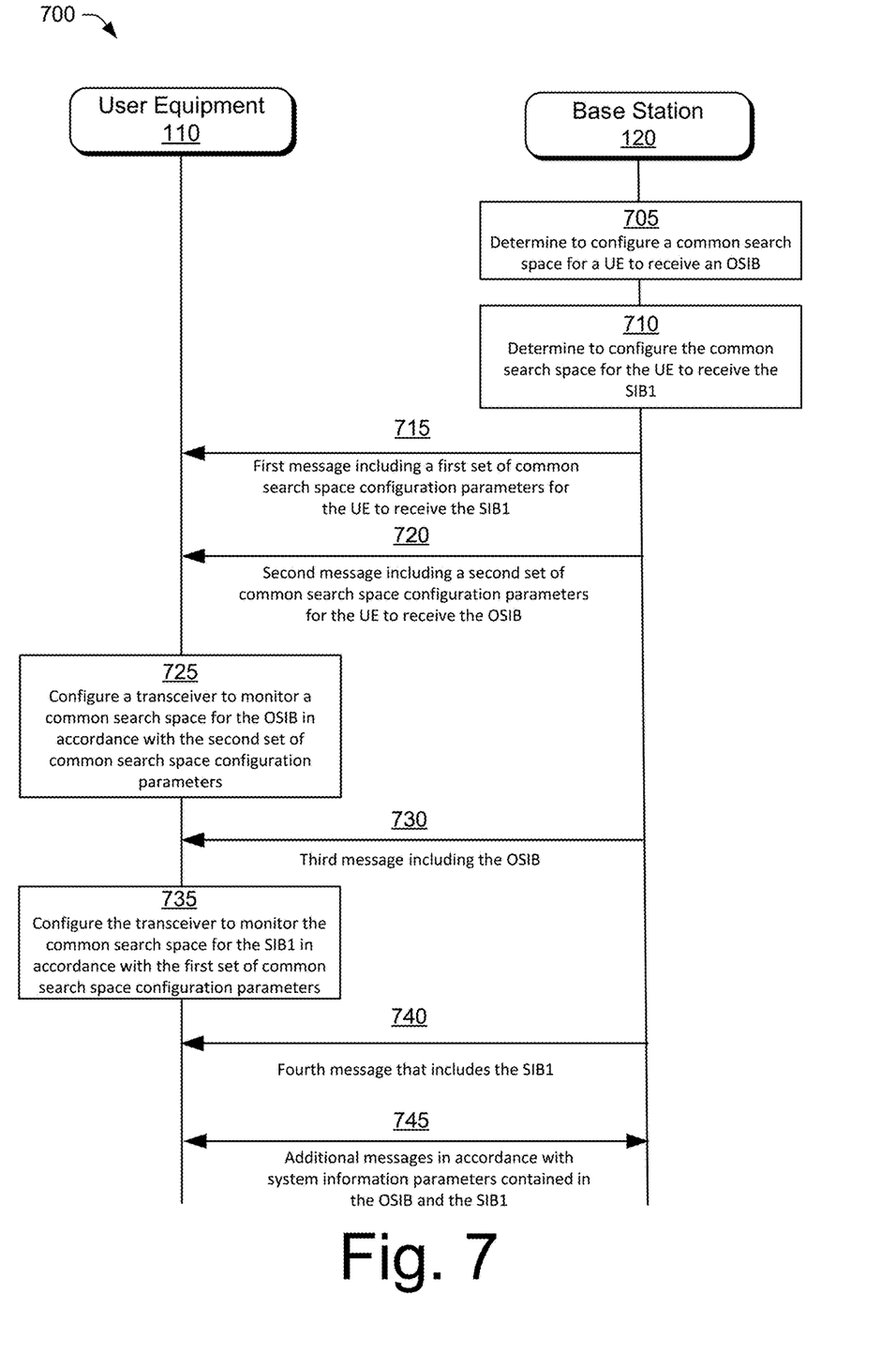
FIG. 7 illustrates example details of signal and control transactions associated with common search space configuration and system information acquisition in accordance with aspects of techniques described herein.

FIG. 7 illustrates details of example signaling and control transactions 700 of a UE and a base station in accordance with various aspects of common search space configuration and system information acquisition. The UE (e.g., the UE 110 of FIG. 1) and the base station (e.g., the base station 120 of FIG. 1) may wirelessly communicate and format the signaling and control transactions in accordance with data frames or subframes of wireless communication protocols. Furthermore, the example signaling and control actions may occur while the UE 110 is in an engaged mode. The engaged mode may correspond to the engaged mode 422 (e.g., an RRC_CONNECTED state) of FIG. 4.

The example signaling and control transactions 700 are directed to common search space configuration and system information acquisition techniques using multiple SIBs (e.g., a SIB1 and an OSIB). In at least some aspects, portions of the signaling and control transactions in FIG. 7 (e.g., portions of the signaling and control transactions that are directed to the OSIB) correspond to signaling and control transactions that support previously described example methods 500 and 600.

Prior to initiating signaling and control transactions, and at operation 705, the base station 120 determines to configure a common search space for the UE 110 to receive an OSIB. At operation 710, the base station 120 determines to configure the common search space for the UE 110 to receive the SIB1.

At operation 715, the base station 120 sends a first message to the UE 110. The first message includes a first set of common search space configuration parameters for the UE 110 to receive the SIB1.

At operation 720 the base station 120 transmits a second message to the UE 110. The second message includes a second set of common search space configuration parameters for the UE 110 to receive the OSIB. In some instances, the second message may be transmitted using an active BWP (e.g., the BWP 330) and the second message may be a message that corresponds with a wireless communication protocol (e.g., an RRCReconfiguration message).

After receiving the first and second messages, and at operation 725, the UE 110 the configures its transceiver to monitor a common search space for the OSIB in accordance with the second set of common search space configuration parameters (e.g., the second set of common search space configuration parameters included in the second message at operation 720).

At operation 730, the UE 110 receives, from base station 120, a third message that includes the OSIB. At operation 735, and after receiving the third message that includes the OSIB, the UE 110 configures its transceiver to monitor the common search space for the SIB1 in accordance with the first set of common search space configuration parameters. At operation 740, the UE 110 receives a fourth message that includes the SIB1.

At operation 745, the UE 110 and the base station 120 wirelessly communicate additional messages in accordance with system information parameters contained in the OSIB and the SIB1.

Note that, as illustrated by the example operations 725-740, the UE 110 prioritizes receiving the OSIB prior to receiving the SIB1. In general, sequences of transceiver configuration, monitoring the common search space for SIBs (e.g., OSIB, SIB1), and receiving SIBs may vary. The described signaling and control transactions are by way of example only and are not constrained by the sequence or order of presentation.

Furthermore, in certain aspects, additional signaling and control transactions may augment or replace the described signaling and control transactions. Such additional signaling and control transactions may include, for example, signaling and control transactions associated with the base station 120 communicating with a core network (e.g., the 5GC 150), the base station 120 communicating with other base stations (to synchronize transmission of one or more messages of a group of messages), the UE 110 receiving signaling and control transactions from another UE, and the like.

In the following paragraphs, several examples are described:

Example 1: A method performed by a base station wirelessly communicating with a UE that is in an engaged mode, the method comprising: determining, by the base station, to configure a common search space through which the UE can receive an OSIB; transmitting, by the base station to the UE, a first message that includes a set of common search space configuration parameters for the UE to receive the OSIB; transmitting, by the base station to the UE, a second message that includes the OSIB, the second message transmitted in accordance with the set of common search space configuration parameters; and transmitting, by the base station to the UE, additional messages in accordance with system information parameters contained in the OSIB.

Example 2: The method as recited in example 1, wherein the common search space configuration parameters identifies resources of an active BWP of a unified air interface between the base station and the UE.

Example 3: The method as recited in example 1 or example 2, wherein the engaged mode corresponds to an RRC_CONNECTED state.

Example 4: The method as recited in any of examples 1-3, wherein the first message is transmitted using dedicated signaling.

Example 5: The method as recited in any of examples 1-4, wherein transmitting the additional messages includes transmitting a PWS message, an ETWS message, or a CMAS message.

Example 6: The method as recited in any of examples 1-5, further comprising the base station receiving, from a core network, the set of common search space configuration parameters for the OSIB and another set of common search space configuration parameters for a SIB1.

Example 7: The method as recited in any of examples 1-6, wherein the base station transmits the second message that includes the OSIB prior to transmitting another message that includes a SIB1 or a MIB.

Example 8: The method as recited in example 7, wherein the first message includes an additional set of common search space configuration parameters for the UE to receive the SIB1 or the MIB.

Example 9: A method performed by a UE wirelessly communicating with a base station, the UE in an engaged mode and the method comprising: receiving, by the UE and from the base station, a first message that includes a set of common search space configuration parameters for the UE to receive an OSIB; configuring, by the UE, a transceiver of the UE to monitor a common search space for the OSIB in accordance with the set of common search space configuration parameters; receiving, by the UE and from the base station using, a second message that includes the OSIB, the second message received through the common search space in accordance with the set of common search space configuration parameters; and transmitting, by the UE and to the base station, additional messages in accordance with system information parameters acquired from OSIB.

Example 10: The method as recited in example 9, wherein: the engaged mode corresponds to an RRC_CONNECTED state; and the UE receives the first message that includes the set of common search space configuration parameters using an active bandwidth part that is associated with the RRC_CONNECTED state.

Example 11: The method as recited in example 9 or example 10, wherein the transceiver of the UE monitors the common search space for the OSIB prior to receiving a SIB1.

Example 12: The method as recited in any of examples 9-11, wherein the OSIB indicates a system information change.

Example 13: The method as recited in any of examples 9-12, wherein the first message is an RRCReconfiguration message.

Example 14: The method as recited in example 9 or example 10, wherein the first message includes an additional set of common search space configuration parameters for the UE to receive a SIB1 or a MIB.

Example 15: A base station comprising: a processor; and a computer-readable storage medium having a search space manager application that, when executed by the processor, directs the base station to perform any one of method examples 1-8.

Example 16: A UE comprising: a processor; and a computer-readable storage medium having a system information block manager application that, when executed by the processor, directs the user equipment to perform any one of method claims 9-14.

What is claimed is:

1. A method performed by a base station wirelessly communicating with a user equipment according to a 3GPP communication protocol or standard, the user equipment being in an engaged mode, the method comprising:

transmitting, by the base station to the user equipment, a first message that includes a set of common search space configuration parameters for the user equipment to receive an other system information block and further includes an additional set of common search space configuration parameters for the user equipment to receive a system information block type 1 or a master information block;

transmitting, by the base station to the user equipment, using the set of common search space configuration parameters a second message that includes the other system information block, the second message transmitted using a set of unified air interface resources identified by the set of common search space configuration parameters; and transmitting, by the base station to the user equipment, additional messages in accordance with system information parameters contained in the other system information block.

2. The method as recited in claim 1, wherein the set of unified air interface resources are part of an active bandwidth part of a unified air interface between the base station and the user equipment.

3. The method as recited in claim 1, wherein the engaged mode corresponds to an RRC_CONNECTED state.

4. The method as recited in claim 1, wherein the first message is transmitted using dedicated signaling.

5. The method as recited in claim 4, wherein the dedicated signaling corresponds to radio resource control signaling.

6. The method as recited in claim 5, wherein transmitting the additional messages corresponds to a paging operation.

7. The method as recited in claim 1, wherein transmitting the additional messages includes transmitting a public warning system message, an earthquake and tsunami warning system message, or a commercial mobile alert system message.

8. The method as recited in claim 1, further comprising the base station receiving, from a core network, the set of common search space configuration parameters for the other system information block and an other set of common search space configuration parameters for a system information block type 1.

9. The method as recited in claim 1, wherein the base station transmits the second message that includes the other system information block prior to transmitting an other message that includes a system information block type 1 or a master information block.

10. The method recited in claim 1, wherein the other system information block is a system information block type 6, a system information block type 7, or a system information block type 8.

11. The method as recited in claim 1, wherein the other system information block is a system information block type 2, a system information block type 3, a system information block type 4, or a system information block type 5.

12. The method as recited in claim 1, further comprising the base station determining the set of common search space configuration parameters for the other system information block.

13. A base station comprising:
a processor; and
a computer-readable storage medium having a search space manager application that, when executed by the processor, directs the base station to:
transmit, by the base station to a user equipment in an engaged mode, a first message that includes a set of common search space configuration parameters for the user equipment to receive an other system information block and further includes an additional set of common search space configuration parameters for the user equipment to receive a system information block type 1 or a master information block;

transmit, by the base station to the user equipment, using the set of common search space configuration parameters a second message that includes the other system information block, the second message transmitted using a set of unified air interface resources identified by the set of common search space configuration parameters; and transmit, by the base station to the user equipment, additional messages in accordance with system information parameters contained in the other system information block.

14. The base station of claim 13, wherein the set of unified air interface resources are part of an active bandwidth part of a unified air interface between the base station and the user equipment.

15. The base station of claim 13, wherein the engaged mode corresponds to an RRC_CONNECTED state.

16. The base station of claim 13, wherein the first message is transmitted using dedicated signaling.

17. The base station of claim 16, wherein the dedicated signaling corresponds to radio resource control signaling.

18. The base station of claim 17, wherein the transmission of the additional messages corresponds to a paging operation.

19. The base station of claim 13, wherein the transmission of the additional messages includes transmitting a public warning system message, an earthquake and tsunami warning system message, or a commercial mobile alert system message.

20. The base station of claim 13, the search space manager application further executable by the processor to direct the base station to:
receive, from a core network, the set of common search space configuration parameters for the other system information block and an other set of common search space configuration parameters for a system information block type 1.

21. The base station of claim 13, wherein the base station transmits the second message that includes the other system information block prior to transmitting an other message that includes a system information block type 1 or a master information block.

22. The base station of claim 13, wherein the other system information block is a system information block type 6, a system information block type 7, or a system information block type 8.

23. The base station of claim 13, wherein the other system information block is a system information block type 2, a system information block type 3, a system information block type 4, or a system information block type 5.

24. The base station of claim 13, the search space manager application further executable by the processor to direct the base station to:
determine the set of common search space configuration parameters for the other system information block.

* * * * *